United States Patent
Ditlinger et al.

[11] 3,844,388
[45] Oct. 29, 1974

[54] AUTOMATIC BRAKE ADJUSTER AND RESET HAVING EXTENSIONABLE FEATURE

[75] Inventors: Richard J. Ditlinger; Peter Brooks, both of South Bend, Ind.

[73] Assignee: The Bendix Corporation, South Bend, Ind.

[22] Filed: Sept. 26, 1973

[21] Appl. No.: 400,987

[52] U.S. Cl. ............................ 188/196 R, 188/71.8
[51] Int. Cl. ........................................... F16d 65/54
[58] Field of Search ....... 188/71.8, 79.5 GE, 79.5 P, 188/196 R, 196 P

[56] References Cited
UNITED STATES PATENTS
3,376,959   4/1968   Holcomb et al. ............... 188/196 R
3,403,755   10/1968   Barrett et al. ............... 188/196 P X

*Primary Examiner*—Duane A. Reger
*Attorney, Agent, or Firm*—Gordon H. Chenez; William N. Antonis

[57] ABSTRACT

A brake adjuster and reset device particularly adapted for multiple disc aircraft disc brakes and provided with telescoping first and second cylinder portions containing concentric first and second crushable tubular portions, respectively, the first of which crushable tubular portions is compressed axially by a piston actuated brake applying pressure plate to provide a first range of adjusted brake positions thereof and the second of which crushable tubular portions is compressed axially by the first cylinder telescoping relative to the second cylinder to provide a second range of adjusted portions of the pressure plate. A first stop member is engaged by the second cylinder portion in a brake applying direction and a spring bearing against second cylinder portion urges the same off the first stop member into engagement with a second fixed stop member spaced apart from the first fixed stop member when the brake is released to establish a predetermined brake reset or running clearance.

8 Claims, 4 Drawing Figures

3,844,388

AUTOMATIC BRAKE ADJUSTER AND RESET HAVING EXTENSIONABLE FEATURE

BACKGROUND OF THE INVENTION

Automatic brake adjusting and reset devices for multiple disc aircraft disc brakes are well known and have taken various forms most of which perform satisfactorily in the brake environment for which they are designed. For example, reference is made to U.S. Pat. No. 3,376,959 in the name O. L. Holcomb, Jr. and entitled "Automatic Brake Adjuster Mechanism." However, in response to demand for lighter, longer life and/or higher capacity disc brakes, aircraft disc brakes have undergone design changes wherein the range of adjustment of the brake has increased and the housing structure which supports the fluid pressure responsive brake actuating pistons as well as the automatic adjustment apparatus is not sufficiently thick in the direction of movement of the automatic adjuster as well as the brake actuating pistons to provide the degree of movement necessary to compensate for the expected wear of the friction discs of the brake. The range of travel of the brake actuating pistons has been suitably extended to provide the desired range of travel by making each piston of the extensionable type as disclosed in U.S. Pat. application Ser. No. 237,777 filed Mar. 24, 1972 in the name of Richard F. Horner. The present invention is particularly adapted for use with a disc brake incorporating the above-mentioned extensionable piston.

SUMMARY OF THE INVENTION

The present invention provided a disc brake automatic adjuster and reset device of a deformable tube type wherein the range of axial adjustment of a brake provided by the deformable tube may be substantially increased without increasing the length of the deformable tube.

It is an object of the present invention to provide a compact brake adjuster and reset device having a relatively large range of adjustment for a multiple-disc disc brake.

It is another object of the present invention to provide a multiple-disc disc brake adjuster and reset device of the deformable tube type having a plurality of telescoping crushable tubular members which are crushed in sequence to provide a range of axial adjustment of the brake in excess of the length of any one of said crushable tubular members.

It is an important object of the present invention to provide an automatic brake adjuster for a multiple-disc disc brake wherein the adjuster is structurally simple and reliable and easily rebuilt for repeated use.

Other objects and advantages of the present invention will be apparent from the following description taken with the accompanying drawings.

DESCRIPTION OF THE PREFERRED EMBODIMENT

Figure 1:
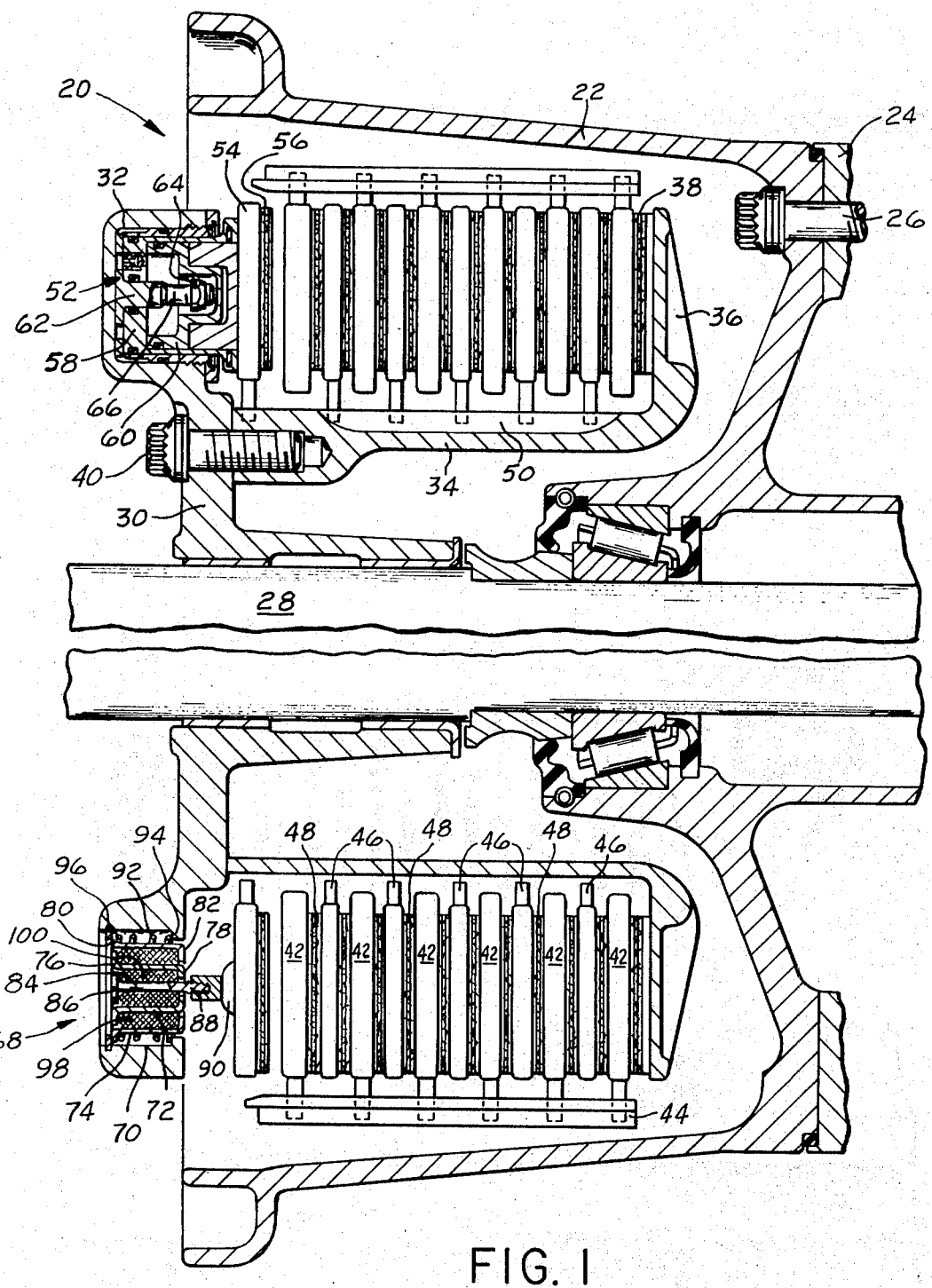
FIG. 1 represents a schematic view in cross section of an aircraft multiple-disc disc brake embodying the present invention.
Figure 2:
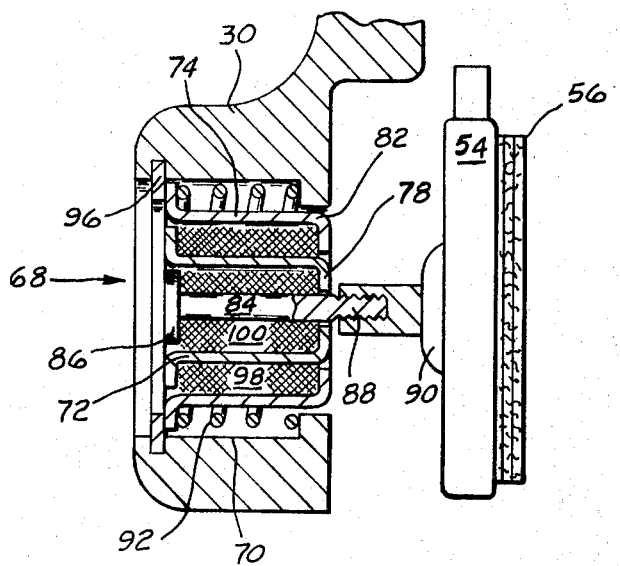
FIG. 2 represents a schematic view of the present invention removed from the disc brake of FIG. 1 and shown in retracted position.

Referring to the drawings and, in particular FIG. 1, numeral 20 designates an aircraft wheel and multiple-disc disc brake therefor. The wheel and brake is conventional and includes two annular wheel sections 22 and 24, only one of which is shown, fastened together by circumferentially spaced-apart bolts and nuts generally indicated by 26. The wheel 20 is suitably journaled on a rotatably fixed axle 28 carried by conventional aircraft landing gear or strut structure, not shown. An annular brake carrier 30 suitably keyed to axle 28 is provided with a plurality of circumferentially spaced-apart cavities 32, only one of which is shown, vented to a source of pressurized fluid, not shown, controlled by the aircraft operator. A torque tube 34 having an integral backing plate 36 suitably lined with friction material 38 is fixedly secured to carrier 30 by a plurality of circumferentially spaced-apart bolts 40, only one of which is shown. A plurality of spaced-apart annular brake rotor members 42 are suitably keyed to a retaining member 44 fixedly secured to wheel section 22 and adapted to permit axial movement of the rotor member 42 relative to wheel section 22. A plurality of annular brake stator members 46 having friction lining 48 secured to opposite faces thereof are suitably keyed for axial movement on torque tube 34 as at 50.

The cavities 32 are each provided with piston means generally indicated by 52 which are pressurized by the fluid in cavity 32 and urged axially into engagement with an annular pressure plate 54 which, in turn, compresses the rotor and stator members 42 and 46 together against the resistance of backing plate 36 to retard rotation of rotor members 42 and thus the wheel attached thereto. The pressure plate 54, like backing plate 36, is lined with friction material 56.

It will be understood that the piston means 52 is necessarily confined in a limited space and must have an axial travel sufficent to compensate for the accumulative axial wear of the friction linings 48 and 56 over a period of brake use. Reference is made to the above-mentioned U.S. application Ser. No. 237,777 for a detailed disclosure of the structure and operation of the piston means 52. For the purpose of the present disclosure, it is sufficient to understand that the piston means 52 is made in two piston sections 58 and 60. The piston section 58 is slidably carried on a fixed post 62 having a stop 64 which is engaged by piston section 58 to limit the axial travel of the latter in response to pressurization of cavity 32. The piston section 60 is slidably carried by piston section 58 and pressurized by fluid passing between a reduced diameter section 66 of post 62 and piston section 58 when the latter engages stop 64 thereby pressurizing piston section 60 which moves axially relative to piston section 58. Thus, the available range of movement of piston means 52 is the travel of piston section 58 as limited by stop 64 plus the subsequent travel of piston section 60 depending upon the extent of wear of the friction linings 48 and 56.

The axial movement of pressure plate 54 actuated by piston means 52 to compress the rotor and stator members 42 and 46 together is a direct indication of the wear status of the friction linings 48 and 56 and may be adjusted to compensate for the wear of linings 48 and 56. To that end, the present invention comprising brake adjusting and reset apparatus is connected to the pressure plate 54 to progressively advance the same axially as wear occurs and retract the pressure plate 54 a predetermined distance upon release of the piston means 52 to provide a constant predetermined running clearance when the brake is released. A plurality of brake adjusting and reset devices generally indicated by 68, only one of which is shown, are contained in axially extending openings 70 in carrier 30 in circumferentially spaced-apart relationship. Each adjusting and reset device 68 includes inner and outer tubular members 72 and 74, respectively, concentrically arranged in opening 70. The inner tubular member 72 is provided with a radially outwardly extending annular flange 76 at one end thereof and, at the opposite end, a radially inwardly extending annular flange 78. The outer tubular member 74 is provided with a radially outwardly extending annular flange 80 at one end thereof and, at the opposite end, a radially inwardly extending flange 82. A rod 84 axially aligned with inner tubular member 72 extends through the opening defined by flange 76 and is provided with a radially outwardly extending flange or head 86 on an end thereof. The opposite end of rod 84 is threadedly secured as at 88 to a fitting 90 which, in turn, is fixedly secured to pressure plate 54 thereby causing the rod 84 to move axially through inner tubular member 72 in response to movement of pressure plate 54 as will be described.

A compression spring 92 surrounding outer tubular member 74 and interposed between flange 80 and an annular shoulder 94 integral with carrier 30 urges the flange 80 into engagement with a snap ring or stop 96 suitably secured in an annular recess formed in carrier 30.

A tubular portion 98 of crushable material having a predetermined force resistance is interposed between flange 76 and flange 82 thereby maintaining the same in spaced-apart relationship in the absence of a predetermined axially directed force imposed on inner tubular member 72 as will be described.

A tubular portion 100 of crushable material having the same predetermined force resistance as tubular portion 78 is interposed between flange 78 and flange on head 86 thereby maintaining the same in spaced-apart relationship in the absence of a predetermined axially directed force imposed on tubular portion 100 by flange or head 86.

Referring to FIG. 1, the disc brake is applied by pressurized fluid introduced to cavities 32 thereby pressurizing pistons 52 which, in turn, urge the pressure plate 54 toward backing plate 36 resulting in frictional engagement of the rotor and stator members 42 and 46 therebetween. The rod 84 is pulled axially by pressure plate 54 thereby displacing the inner and outer tubular members 72 and 74 likewise as a result of the resistance of tubular portions 98 and 100 to the compression spring 92 which collapses to a closed coil position thereby preventing further movement of outer tubular member 74. Assuming the rotor and stator members 42 and 46 are fully engaged when the outer tubular member 74 is forced in position against closed coil spring 74, the pressure plate 54 is not in need of adjustment. Upon depressurization of the piston 52, the disc brake is released in response to pressure plate 54 being withdrawn a predetermined axial distance by rod 84 under the influence of compression spring 92 which urges flange 80 into engagement with snap ring 96 to provide a predetermined disc brake running clearance.

Now, assuming that the friction linings 38, 48 and 56 are worn to a certain extent requiring axial adjustment of pressure plate 54 to compensate therefor, a subsequent brake application by pressurization of pistons 52 will displace the pressure plate 54 in the heretofore-mentioned manner to a position where outer tubular member 74 is fixed in position against closed coil spring 92. However, the force derived from the pistons 52 and imposed on pressure plate 54 as well as rods 84 connected thereto overcomes the resistance of crushable tubular portion 100 which collapses axially under head 86 permitting rod 84 and thus pressure plate 54 connected thereto to continue to move under the influence of pistons 52 to the extent that the disc brake rotor and stator members 42 and 46 are compressed between pressure plate 54 and backing plate 36 to fully engage the disc brake thereby compensating for the worn linings 38, 48 and 56. Upon depressurization of piston 52, the brake is released by pressure plate 54 which is retracted by rods 84 under the influence of compression springs 92 urging flanges 80 into engagement with snap rings 96 thereby establishing the heretofore-mentioned predetermined disc brake running clearance.

Figure 3:
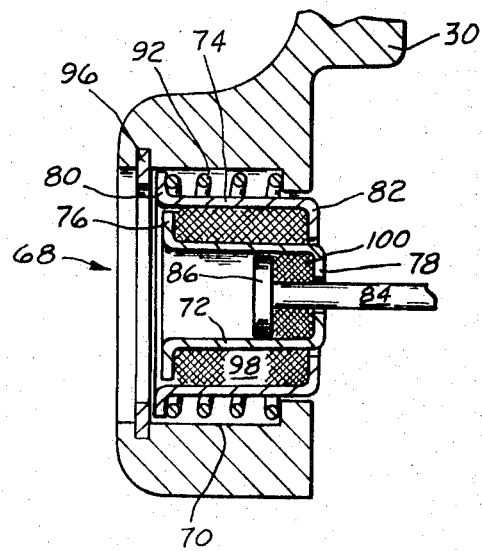
FIG. 3 represents the structure of FIG. 2 shown in partially extended form.
Figure 4:
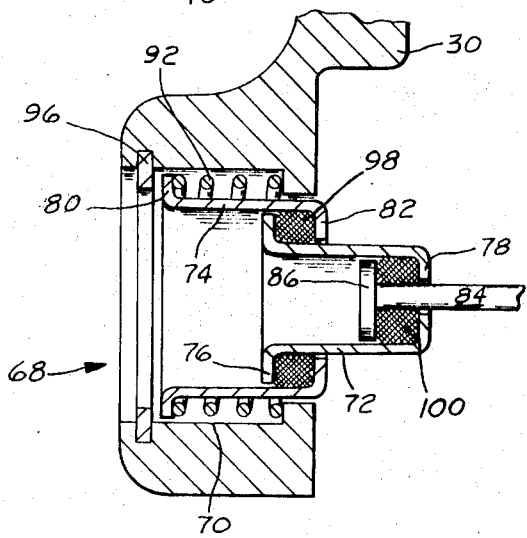
FIG. 4 represents the structure of FIG. 2 shown in fully extended form.

As friction lining wear progresses, the tubular portion 100 is progressively crushed upon brake application to the extent shown in FIG. 3 which illustrates tubular portion 100 in a completely crushed condition. Further compensation for lining wear is provided by tubular portion 98 which, like tubular portion 100, is crushed axially by flange 76 as a result of inner tubular member 72 being drawn axially relative to outer tubular member 74 under the influence of rod 84 in response to pressurization of pressure plate 54. As in the case of tubular portion 100, the tubular portion 98 is progressively crushed to a completely crushed condition, as shown in FIG. 4, thereby providing maximum displacement of pressure plate 54 relative to carrier 30 in response to wear of friction linings 38, 48 and 56. It will be noted that the pressure plate 54 is always reset to a predetermined released position by the spring 92 which expands axially from its closed coil position to urge flange 80 into engagement with snap ring 96.

The sequence of crushing tubular portions 98 and 100 is not critical since the net result is the same. The tubular portion 100 may crush before or after tubular portion 98 or crushing may alternate between the two with no undesirable effect on the operation of the adjuster and reset device 68.

The crushable tubular portions 98 and 100 may be fabricated from conventional annular columns of, for example, alternate sheets of flat aluminum foil and corrugated aluminum foil bonded by a suitable adhesive thereby providing a honeycomb structure capable of positive energy absorption at a predetermined constant rate. Various other conventional materials and structural shapes may be suitable for use in forming the tubular portions 98 and 100. However, for a preferred form, reference is made to energy absorbing honeycomb structure sold under the U.S. trade name Tube-Core by the Hexcel Corp. and shown and described in readily available literature published thereby.

It will be noted that the brake adjusting apparatus 68 may be quickly and easily overhauled with a minimum of replacement elements. To that end, the crushed tubular members 98 and/or 100 are removed and replaced by uncrushed members 98 and/or 100 thereby rendering the brake adjusting apparatus 68 capable of repeated use. The remaining elements of the brake adjusting apparatus 68 are not subject to deterioration and do not require replacement thereof.

We claim:

1. Automatic brake adjusting apparatus for a multiple-disc disc brake having an axially movable fluid pressure actuated pressure plate for applying the brake comprising:
   an annular housing provided with a plurality of circumferentially spaced-apart cavities each of which is arranged with its axis perpendicular to said pressure plate;
   a first tubular member disposed in each of said cavities for axial movement therein;
   first and second stop means in each of said cavities and engaged by said first tubular member to establish fixed brake released and brake energized positions, respectively, thereof;
   a second tubular member disposed in each of said cavities for telescoping movement relative to said first tubular member;
   a rod member fixedly secured at one end to said pressure plate and extending therefrom into said second tubular member;
   a radially extending flange on the free end of said rod member;
   a first axially crushable tubular member interposed between said second tubular member and said flange;
   a second axially crushable tubular member interposed between said first and second tubular members;
   said first and second tubular members being actuated by said pressure plate in response to pressurization of the latter;
   said first tubular member engaging said second stop means whereupon further movement of said pressure plate in a brake applying direction occurs as a result of progressive axial crushing of said first and second crushable members to the extent required to compensate for wear of the frictional surfaces of said multiple disc brake;
   said second crushable member being crushed axially thereby permitting said second tubular member to telescope axially relative to said first tubular member to extend the range of adjustment of said pressure plate beyond that provided by said first crushable member.

2. Automatic brake adjusting apparatus as claimed in claim 1 wherein:
   said second stop means includes a compression spring movable to a closed coil condition interposed between said housing and said first tubular member and urging said first tubular member into engagement with said first stop means upon depressurization of said pressure plate;
   said first and second stop means having a predetermined spaced-apart relationship;
   said compression spring being compressed to a closed coil condition in response to pressurization of said pressure plate.

3. Automatic brake adjusting apparatus as claimed in claim 1 wherein:
   said first tubular member surrounds said second tubular member and is provided with a first radially inwardly directed flange at one end thereof and an opposite radially directed second flange at the opposite end thereof;
   said second tubular member provided with a third radially inwardly directed flange at one end thereof and opposite radially directed fourth flange at the opposite end thereof;
   said second crushable member interposed between said first flange and said fourth flange.

4. Automatic brake adjusting apparatus as claimed in claim 3 wherein:
   said first crushable member is interposed between said third flange and said flange on said rod member.

5. Automatic brake adjusting apparatus as claimed in claim 2 wherein:
   said compression spring surrounds said first tubular member and bears against said second flange.

6. Automatic brake adjusting apparatus as claimed in claim 1 wherein:
   said first stop means is an annular snap ring removably secured to the wall of each of said cavities.

7. Automatic brake adjusting apparatus as claimed in claim 2 wherein:
   each of said cavities is provided with an annular spring retaining shoulder formed in the wall thereof;
   said compression spring bears against spring retaining shoulder and said second flange.

8. Automatic brake adjusting apparatus as claimed in claim 1 wherein:
   said first and second tubular members and said rod member are coaxially aligned in each of said cavities.

* * * * *